No. 750,379. PATENTED JAN. 26, 1904.
T. LINDENBERG.
PNEUMATIC TIRED WHEEL.
APPLICATION FILED AUG. 18, 1902.
NO MODEL.

WITNESSES:
S. Edwin Ward.
A. L. Phelps

INVENTOR
Theodore Lindenberg
BY
C. A. Shepherd
ATTORNEY

No. 750,379. Patented January 26, 1904.

UNITED STATES PATENT OFFICE.

THEODORE LINDENBERG, OF COLUMBUS, OHIO.

PNEUMATIC-TIRED WHEEL.

SPECIFICATION forming part of Letters Patent No. 750,379, dated January 26, 1904.

Application filed August 18, 1902. Serial No. 120,011. (No model.)

*To all whom it may concern:*

Be it known that I, THEODORE LINDENBERG, a citizen of the United States, residing at Columbus, in the county of Franklin and State of Ohio, have invented a certain new and useful Improvement in Pneumatic-Tired Wheels, of which the following is a specification.

My invention relates to the improvement of pneumatic-tired wheels; and the objects of my invention are to so construct the tire portion of a wheel as to admit of the employment of a pneumatic or air-filled tire and to so incase the same as to obviate any tendency toward the same becoming punctured or subjected to undesirable wear and to produce other improvements the details of which will be more fully pointed out hereinafter. These objects I accomplish in the manner illustrated in the accompanying drawings, in which—

Figure 1:
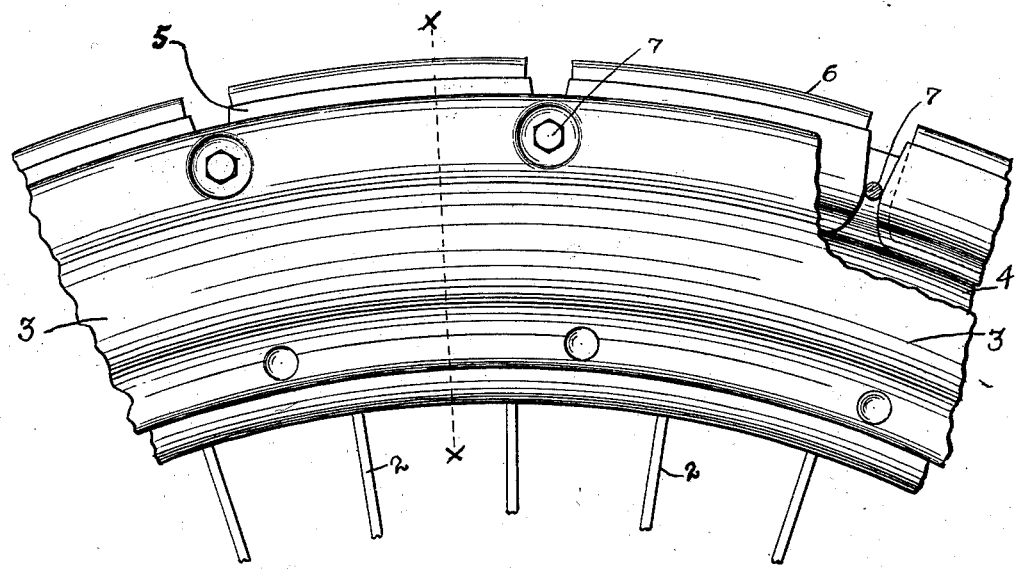
Figure 2:
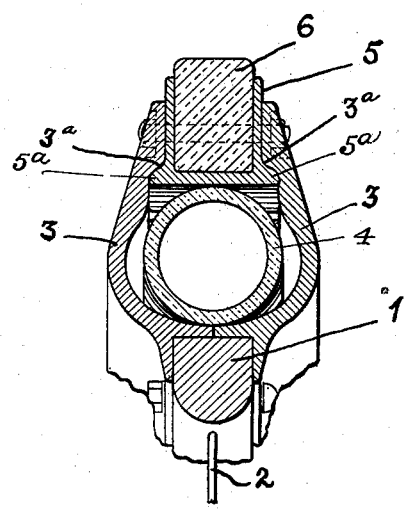

Figure 1 is a view in elevation of a portion of a wheel rim and tire having my improved construction, showing for the sake of clearness a part of one of the side rings or plates broken away; and Fig. 2 is a transverse section on line $x$ $x$ of Fig. 1.

Similar numerals refer to similar parts throughout both views.

1 represents a wheel-rim, with which the spokes 2 may be connected in the usual or any desirable manner.

3 represents opposing circular side plates, the bases or inner portions of which are formed angular, as indicated in Fig. 2 of the drawings, these angular base portions being adapted, as shown, to embrace the outer portion of the rim 1, the inturned upper lips of said angles bearing upon the periphery of the rim and the downwardly-extending portions of the angles being secured against the sides of said rim. From the rim said side plates or rings 3 curve outwardly and thence incline inward, and between the inner and outwardly curved portions of said plates is provided a suitable form of pneumatic or air-filled tire 4.

Between the upper end portions of the side rings 3 are arranged loosely at desirable intervals separated tire-shoes 5, each of which is curved in the desired arc of the circle to be described and each of said tires being in the nature of a box-like section, the inner or base portion of which is flanged laterally, as indicated at $5^a$, said laterally-flanged portions being adapted to engage internal shoulders $3^a$ of the side rings 3. The shoes thus formed and arranged have their inner sides or surfaces in contact with the pneumatic tire 4, and within each of said shoes is provided a bearing-body of rubber, such as is indicated at 6, said rubber body extending outward beyond the mouths of the shoes to form the tread or ground-bearing projections, as shown. In their upper portions the converging side plates or rings 3 are united at intervals by transverse bolts 7, which may, as shown, pass between the ends of the shoes 5.

From the construction which I have herein shown and described it will be seen that the pneumatic tire 4 is embraced between the shoes 5 and the inturned lips of the base portions of the plates 3 and that the weight of the vehicle on which the wheels are used will thus be directly upon said pneumatic tires and that the ground-bearing, however, of the wheels would come directly upon the projecting rubber fillings 6 of the shoe, the compression of which from the weight of the vehicle will result in the formation of an approximately continuous tread. It will be understood that the shoes 5 are permitted an inward and outward movement between the outer portions of the side rings 3, thus permitting the pneumatic tire to perform its office of cushioning the load.

From the construction described it will be seen that a simple and reliable wheel construction is provided in which the usual results of the use of a pneumatic tube may be attained without danger of said tube becoming punctured or otherwise injured from contact with the ground or obstructions thereon.

Having now fully described my invention, what I claim, and desire to secure by Letters Patent, is—

1. In a pneumatic-tired wheel, the combination with opposing ring-plates 3, a wheel-rim clamped by the inner portions of said ring-plates, and separated shoes 5 clamped between the outer portions of said ring-plates, of a pneumatic tire arranged between the ring-plates and between the shoes and wheel-rim and a pliable tread-body contained in each of said shoes and projecting therefrom, substantially as specified.

2. In a pneumatic-tired wheel, the combination with opposing side ring-plates 3, a wheel-rim embraced by the inner portions of said ring-plates and secured thereto and a pneumatic tire embraced between the central portions of said ring-plates, of shoes 5 arranged at intervals between and embraced by the outer portions of the ring-plates, bolts connecting said ring-plates between said shoes and pliable tread-bodies connected with and projecting from each of said shoes, substantially as specified.

THEODORE LINDENBERG.

In presence of—
C. C. SHEPHERD,
A. L. PHELPS.